Jan. 12, 1954 N. J. ALLBRIGHT 2,665,630
CONTAINER
Filed Nov. 21, 1950 2 Sheets-Sheet 1
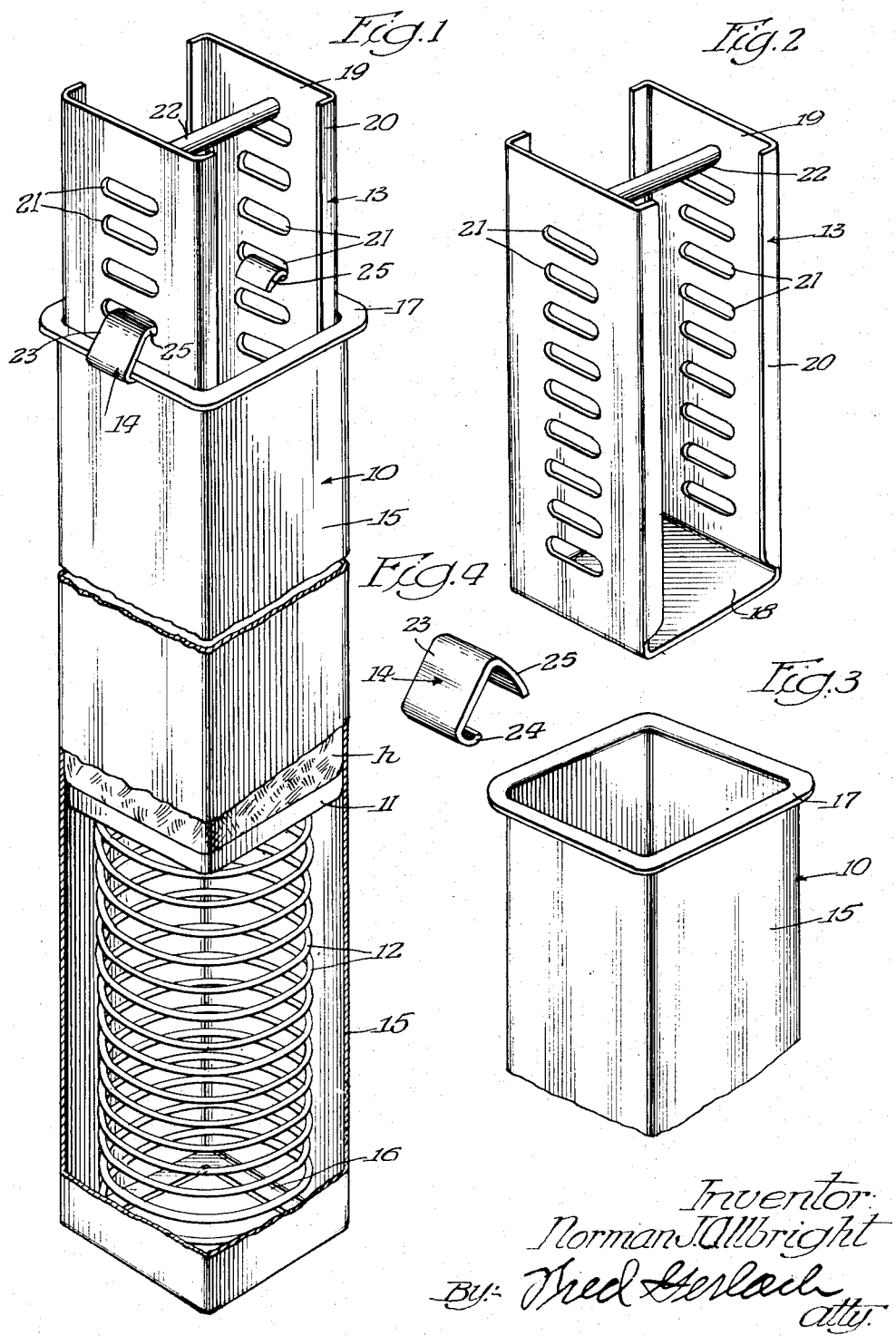
Inventor:
Norman J. Allbright
By: Fred Gerlach
atty.

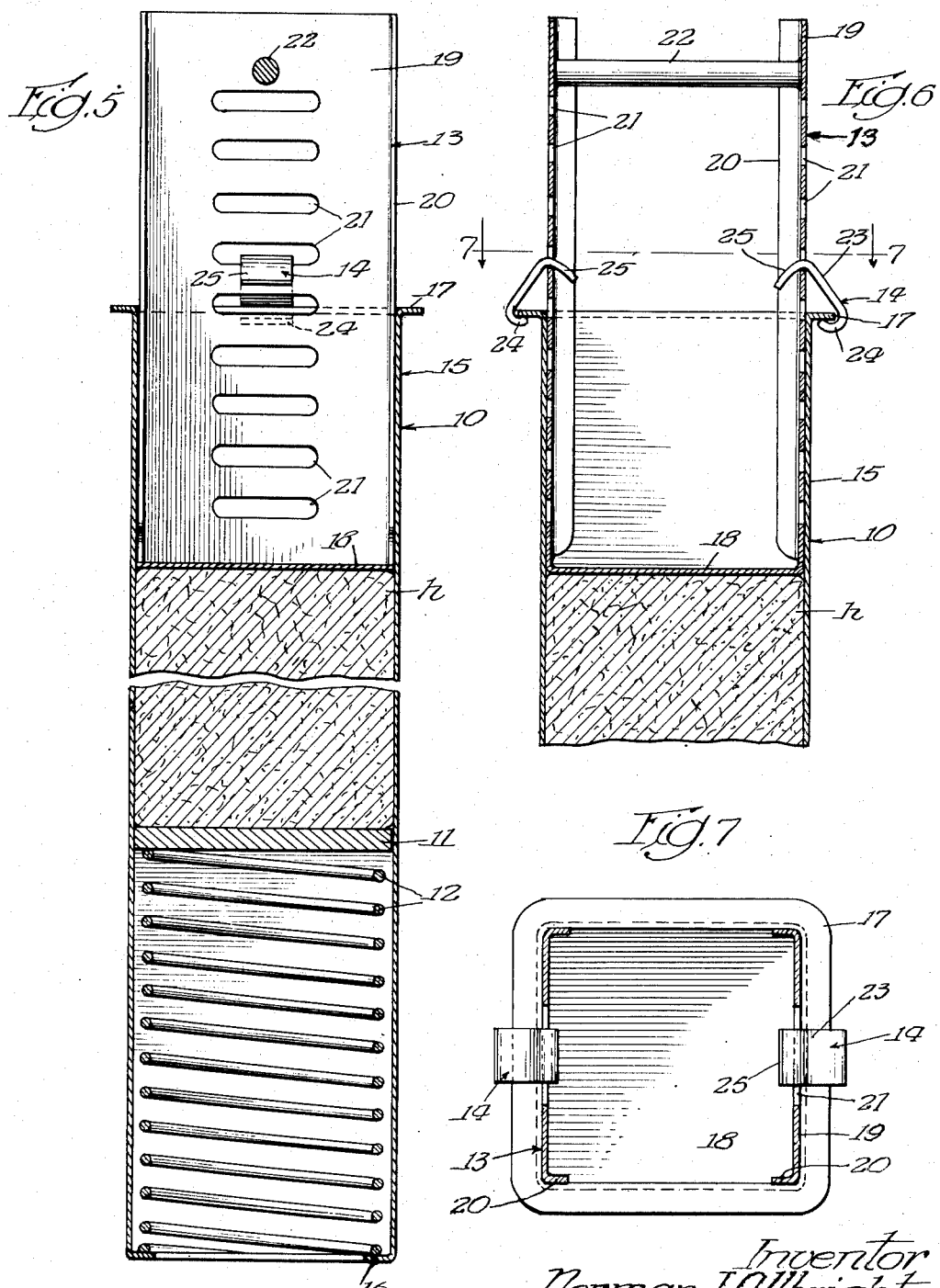

Patented Jan. 12, 1954

2,665,630

UNITED STATES PATENT OFFICE 2,665,630

CONTAINER

Norman J. Allbright, Chicago, Ill., assignor to The Allbright-Nell Company, Chicago, Ill., a corporation of Illinois Application November 21, 1950, Serial No. 196,925

3 Claims. (Cl. 99—351)

The present invention relates generally to containers. More particularly the invention relates to that type of container which is especially designed for use in the meat packing industry, serves as a medium or instrumentality for retaining and molding a piece of fresh, boneless meat, such as a ham, during cooking or processing thereof and comprises an open top body, and a removable, vertically slidable cover member for closing the open top of the body.

One object of the invention is to provide a container of this type which is an improvement upon, and has certain inherent advantages over, previously designed containers for the same purpose and is characterized by the fact that it embodies a novel construction, design and arrangement of its component parts and may be handled or manipulated with ease and facility.

Another object of the invention is to provide a container of the type under consideration in which the body is vertically elongated and of uniform cross section from end to end, embodies at its lower end a continuous inwardly extending flange and has associated with it a vertically slidable bottom member and in addition a vertically extending spiral compression spring which is interposed between the bottom member and the aforementioned inwardly extending flange and serves when the bottom member is depressed in connection with insertion of a piece of fresh, boneless meat into the body and mounting of the cover member in place to urge the bottom member upwards and thus endwise compress the piece of meat between the bottom member and the cover member.

Another object of the invention is to provide a container of the aforementioned type and character in which the upper end of the body is provided with a continuous outwardly extending flange and the slidable cover member is vertically insertable into, and removable from, the upper end of the body, is of U-shaped configuration, consists of a bottom piece and a pair of laterally spaced upwardly extending side pieces and has associated with it a pair of separate C-shaped clips for releasably securing it in the various positions into which it is slid in connection with closing of the upper end of the body after insertion of a piece of meat into the body.

Another object of the invention is to provide a container of the last mentioned character in which the side pieces of the cover member are provided with vertical or longitudinal series of equidistantly spaced transversely extending slots, and the C-shaped clips for releasably securing the cover member in its operative position are associated with the side pieces respectively and are adapted in connection with use thereof to have the lower ends hooked around opposed portions of the outwardly extending flange on the upper end of the body and their upper ends manipulated into hooked relation with the adjacent slots in the side pieces of the cover member.

A further object of the invention is to provide a container of the type and character heretofore mentioned in which the vertically slidable U-shaped cover member is provided with a horizontal rod which extends between, and is fixedly secured to, the upper ends of the slotted side pieces and has a twofold purpose in that it serves to cross connect and reenforce the side pieces and also to form a handle whereby the cover member may be readily manipulated into and out of place and the container as a whole, after securing of the cover member in place, may be transported or moved from place to place.

A still further object of the invention is to provide a container which is generally of new and improved construction, effectively and efficiently fulfills its intended purpose and is capable of being produced at a comparatively low cost.

Other objects of the invention and the various advantages and characteristics of the present container will be apparent from a consideration of the following detailed description.

The invention consists in the several novel features which are hereinafter set forth and are more particularly defined by claims at the conclusion hereof.

In the drawings which accompany and form a part of this specification or disclosure and in which the like numerals of reference denote corresponding parts throughout the several views:

Figure 1 is a fragmentary top perspective of a container embodying the invention, certain portions of the lower end of the body being broken away in order to illustrate or show the arrangement and design of the vertically slidable bottom member and the spiral spring which is interposed between the bottom member and the continuous inwardly extending flange on the lower end of the body and serves, after insertion of a piece of fresh, boneless meat into the container body, to urge the bottom member upwards in order to compress endwise the piece of meat;

Figure 2 is a top perspective view of the cover member illustrating in detail the construction and design of the latter;

Figure 3 is a perspective of the upper end of a container body showing in detail the continuous outwardly extending flange for receiving the lower ends of the C-shaped clips which serve releasably to hold the cover member in the various positions into which it is slid in connection with use thereof;

Figure 4 is a perspective of one of the clips;

Figure 5 is a vertical section showing the various parts of the container in their operative position;

Figure 6 is a fragmentary section taken at right angles to Figure 5 and illustrating in detail the manner in which the two C-shaped clips serve releasably to hold the cover member in place; and Figure 7 is a horizontal section on the line 7—7 of Figure 6.

The container which is shown in the drawings constitutes the preferred form or embodiment of the invention. It is especially designed for use in the meat packing industry and is adapted to retain and mold or shape a piece of fresh, boneless meat, such as a ham $h$, during cooking and other processing of the latter. As its components the container comprises a vertically elongated tubular body 10, a bottom member 11, a spring 12, a cover member 13 and a pair of clips 14 for releasably securing the cover member in its hereinafter described operative position.

The body 10 is preferably square in cross section and comprises four vertically elongated rectangular sides 15, the side margins of which are formed integrally with one another. The sides 15 are formed of sheet or plate metal of such gauge that the body as a whole is rigid while at the same time it is sufficiently light in weight to permit it to be handled with ease or facility. The body 10 is of uniform cross section from end to end and it is contemplated that its interior cross sectional area will be less than the maximum cross sectional area of the ham $h$ in order that when the ham is introduced into the body it will be under lateral or sidewise compression. If desired, the ham may be introduced into the container body by the method and apparatus which are disclosed in, and form the subject matter of, my copending United States patent application Serial No. 146,854, filed February 28, 1950. Although the body 10 is illustrated and described as standing vertically it is to be understood that it may be placed in any desired position, such, for example, as a horizontal position. The lower end of the body is provided with a continuous inwardly extending flange 16 and the upper end of the body is provided with a continuous outwardly extending flange 17. The flange 16 is formed integrally with, and extends inwards at right angles to, the lower margins of the sides 15 of the body. The other flange, i. e., the flange 17, is formed integrally with, and extends outwards at right angles to, the upper margins of the body sides 15. Preferably the corner portions of the continuous outwardly extending flange 17 are curved or rounded so as to eliminate sharp points. The flanges 16 and 17 at opposite ends of the body 10 have respectively certain particular hereinafter described functions or purposes and serve to strengthen or reenforce the body against lateral collapse or distortion.

The bottom member 11 is in the form of a square metallic plate and is adapted to have the lower end of the ham $h$ rest on it after the ham is inserted into the body. It is shaped conformably to the interior of the body so that it is capable of sliding upwards and downwards in the lower end of the body where it is normally positioned or located.

The spring 12 is vertically elongated and of spiral or helical character. It is disposed within the lower end of the container body 10 as shown in Figures 1 and 5 and serves, after depression of the bottom member 11 in connection with insertion of the ham into the container and locking of the cover member in its operative position, to urge the bottom member upwards so as to compress the ham lengthwise or endwise between the bottom member and the cover member. The diameter of the spring 12 is uniform from end to end and is slightly less than the width of the space between either opposed pairs of body sides. The lower end of the spring 12 rests on the continuous inwardly extending flange 16 on the lower end of the container body and the upper end of the spring abuts against the bottom surface of the vertically slidable bottom member 11. It is contemplated that in connection with use of the container the ham $h$ will first be introduced into the container through the open upper end of the latter. After insertion of the ham into the body the cover member 13 is inserted into the upper end of the body and then slid downwards until it engages the upper end of the ham $h$ and then forces the ham downwards until it has depressed the bottom member 11 and compressed the spring 12 to any desired extent. After securing the cover locking member in place as described in detail hereafter, the container is placed in hot water or any other cooking environment in order to cook the ham $h$. After the cooking operation the container is placed in a chilling compartment in order to chill and solidify the ham. In connection with chilling the ham retains the cross sectional shape of the container. At the conclusion of the chilling operation the cover member is removed. In connection with removal of the cover the spiral compression spring 12 slides the cooked and chilled ham upwards to a limited extent, thus loosening it so that it may be readily slid from the container body through the open upper end of the latter.

The cover member 13 is U-shaped so far as configuration is concerned. It is in the form of a one-piece sheet metal stamping and consists of a square imperforate bottom piece 18 and a pair of laterally spaced, upwardly extending side pieces 19. The bottom piece 18 is shaped conformably to, and is adapted to slide up and down in, the upper end of the container body 10. The side pieces 19 are disposed one opposite the other and in parallel relation. They are vertically elongated and have the lower ends thereof formed integrally with two opposite side marginal portions of the square imperforate bottom piece 18. The side margins of the side pieces are provided with integral inwardly extending right angle flanges 20 for reenforcing purposes. As shown in the drawings, the cover member 13 is insertable into, and removable from, the upper end of the container body 10. Each of the side pieces 19 of the cover member is provided with a vertical or longitudinal series of equidistantly spaced transversely extending slots 21. As best shown in Figure 6, the slots in one of the side pieces of the cover member are horizontally aligned with those in the other side piece. Between the upper ends of the side pieces 19 of the cover member 13 is a horizontal rod 22, the ends of which are welded or otherwise fixedly secured in place. This rod has a two fold purpose in that it cross connects the upper ends of the side pieces 19 for bracing or reenforcing purposes and forms a handle whereby the cover member may be readily manipulated into and out of place and the container as a whole, after securing of the cover in place, may be transported from place to place. Preferably the handle forming rod is circular in cross section and is located directly above the uppermost slots in the side pieces of the cover member 13. By having the rod of circular cross section it may be readily gripped and presents no sharp corners. After insertion of the ham $h$ into the central portion of the interior of the container body it is contemplated that the cover member 13 will be inserted into the upper end of the body and then slid downwards until it engages the upper end of the ham and then slides the ham downwards a sufficient distance to cause depression of the bottom member 11 and compression of the spiral spring 12. In connection with sliding of the cover member into place the operator grips the handle forming rod 22. As shown in the drawings, the upwardly extending side pieces 19 of the cover member are approximately twice as long as the square imperforate bottom piece 18.

The clips 14 are in the form of one-piece plate metal stampings and are adapted to be associated with, and applied to, the two side pieces 19, respectively. They are C-shaped so far as configuration is concerned and each consists of a substantially flat intermediate part 23, a lower end part 24, and an upper end part 25. The lower end parts 24 of the clips extend at approximately 60° angles with respect to the intermediate parts 23 and are adapted to hook around and under opposed portions of the outwardly extending flange 17 on the upper end of the container body, as best shown in Figures 1 and 6. The upper end parts 25 of the clips 14 are connected to the upper ends of the intermediate parts 23 and extend inwards and downwards relatively thereto. They are arcuate from the inner portions thereof to their outer portions and are adapted to be manipulated into hooked relation with any opposite or opposed pair of slots in the side pieces 19 of the cover member 13, as shown in Figures 1, 6 and 7 of the drawings. The clips, as heretofore indicated, serve releasably to secure the cover member in its operative position wherein it is disposed part way in the upper end of the tubular body 10 of the container. After the cover member is slid downwards into place it is contemplated that the inwardly extending lower end parts 24 of the clips 14 will be hooked under the central parts of the portions of the flange 17 that are directly outwards of the side pieces 19 of the cover member. Thereafter the clips will be swung inwards in order to bring the inwardly and downwardly extending arcuate upper end parts 25 into hooked relation with the adjacent slots in the side pieces of the cover member. In connection with manipulation of the clips into their operative or cover member locking position it is contemplated that the cover member will be urged downwards against the force of the spiral spring 12. When the cover member is released after manipulation of the clips into place the spring exerts, through the medium of the bottom member 11 and the ham $h$, such upward pressure on the cover member as to hold the clips in their operative position. When it is desired to remove the cover member from the container body the member is slid downwards against the force of the spiral spring a sufficient distance to release the clips so that they may be swung outwards in order to withdraw the upper end parts thereof from hooked relation with the adjacent slots in the side pieces of the cover member. After outward swinging of the clips the cover member is free so that it may be withdrawn from the container body by sliding it upwards relatively thereto.

The herein described container is essentially simple in design and hence may be manufactured or produced at a comparatively low cost. It effectively and efficiently fulfills its intended purpose and may be assembled and dismantled with facility. Because the container includes the spring loaded or biased bottom member 11 and the particular cover member 13 any ham or other fresh boneless piece of meat that is processed within the container is of uniform shape and density throughout after the processing operation.

Whereas the container has been described as a medium or instrumentality for retaining and molding during processing a piece of fresh boneless meat, such as a ham, it is to be understood that the container has other capabilities of use. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. As a new article of manufacture, a container designed to retain and mold a piece of meat or the like during processing thereof and comprising a tubular open ended body adapted to extend vertically and have the piece of meat introduced into it through its upper end and provided at its upper end with a continuous integral outwardly extending right angle flange, a bottom member shaped conformably to, and mounted for vertical sliding movement in, the interior of the lower end of the body, adapted to underlie and support the piece of meat, and provided with spring means for urging it upwards, a vertically elongated U-shaped cover member shaped conformably to the interior of the upper end of the body, consisting of a bottom piece and laterally spaced upwardly extending side pieces, adapted after insertion of the piece of meat into the body to be inserted into the upper end of said body and then slid downwards into an operative position wherein it engages the upper end of the piece of meat in such manner that said piece of meat is compressed endwise between the bottom piece and the bottom member, and having in its side pieces vertically extending series of spaced apart slots, and a pair of separately formed independent C-shaped clips operative releasably to secure the cover member in its operative position, associated with the side pieces, respectively, and adapted in connection with use thereof and after sliding of the cover member into its said operative position to have their lower ends hooked around opposed portions of the outwardly extending flange and the upper ends thereof manipulated into hooked relation with the adjacent slots in said side pieces of the cover member.

2. As a new article of manufacture, a container designed to retain and mold a piece of meat or the like during processing thereof and comprising a tubular open ended body formed of sheet metal, adapted to extend vertically and have the piece of meat introduced into it through its upper end and provided at its lower end with a continuous inwardly extending integral right angle flange and its upper end with a continuous outwardly extending integral right angle flange, a bottom member shaped conformably to, and mounted for vertical sliding movement in, the interior of the lower end of the body and adapted to underlie and support the piece of meat, a single vertically extending spiral compression spring disposed in the lower end of the body, having the lower end thereof resting on the inwardly extending flange and its upper end in abutment with the bottom member and adapted when compressed in connection with insertion of the piece of meat into the body to exert upward pressure against said bottom member, a vertically elongated U-shaped cover member shaped conformably to the interior of the upper end of the body consisting of a bottom piece and a pair of laterally spaced upwardly extending side pieces with inwardly extending right angle flanges, adapted after insertion of the piece of meat into the body to be inserted into the upper end of said body and then slid downwards into an operative position wherein it engages the upper end of the piece of meat in such manner that said piece of meat is compressed endwise between the bottom piece and the bottom member, and having in its side pieces vertically extending series of equidistantly spaced transversely extending slots, and a pair of separately formed independent C-shaped clips operative releasably to secure the cover member in its operative position, associated with the side pieces of the cover member, respectively, and adapted in connection with use thereof and after sliding of the cover member into its operative position to have the lower ends thereof hooked around opposed portions of the outwardly extending flange and their upper ends manipulated into hooked relation with the adjacent slots in said side pieces of the cover member.

3. As a new article of manufacture, a container designed to retain and mold a piece of meat or the like during processing thereof, and comprising a tubular open ended body of square and uniform cross section from end to end formed of sheet metal, adapted to extend vertically and have the piece of meat inserted into it through its upper end, and provided at its lower end with a continuous inwardly extending integral right angle flange and at its upper end with a continuous outwardly extending integral right angle flange, a square bottom member mounted for vertical sliding movement in the lower end of the body and adapted to underlie and support the piece of meat, a single vertically extending spiral spring disposed in the lower end of the body between the inwardly extending flange and the bottom surface of the body member, and adapted when compressed in connection with insertion of the piece of meat into the body to exert upward pressure against said bottom member, a vertically elongated U-shaped cover member formed of sheet metal, shaped conformably to the interior of the upper end of the body, consisting of a square bottom piece and a pair of laterally spaced upwardly extending side pieces at opposite sides of the bottom piece and with integral full length inwardly extending side flanges for reinforcing purposes, adapted after insertion of the piece of meat into the body to be inserted into the upper end of said body and then slid downwards into an operative position wherein it engages the upper end of the piece of meat in such manner that said piece of meat is compressed endwise between the bottom piece and the bottom member, having in its side pieces vertically extending series of spaced apart transversely extending slots, and provided between the upper ends of its side portions with a handle forming rod, and a pair of separately formed independent C-shaped clips operative releasably to secure the cover member in its operative position, associated with the side pieces of the cover member, respectively, and adapted in connection with use thereof and after sliding of the cover member into its operative position to have the lower ends thereof hooked around opposed portions of the outwardly extending flange and their upper ends manipulated into hooked relation with the adjacent slots in said side pieces of the cover member.

NORMAN J. ALLBRIGHT.

References Cited in the file of this patent

UNITED STATES PATENTS

| Number | Name | Date |
|---|---|---|
| 1,073,915 | Lendner et al. | Sept. 23, 1913 |
| 1,317,071 | Cammans | Sept. 23, 1919 |
| 1,970,168 | Collins | Aug. 14, 1934 |
| 1,981,889 | Wolff | Nov. 27, 1934 |
| 2,484,963 | Samuel | Oct. 18, 1949 |

FOREIGN PATENTS

| Number | Country | Date |
|---|---|---|
| 204,664 | Great Britain | Oct. 4, 1923 |
| 260,384 | Great Britain | Nov. 4, 1926 |